United States Patent
Yu et al.

(10) Patent No.: US 12,114,079 B2
(45) Date of Patent: Oct. 8, 2024

(54) ELECTRONIC DEVICE FOR ADJUSTING EXPOSURE VALUE OF IMAGE INCLUDING FACE

(71) Applicant: Samsung Electronics Co., Ltd., Suwon-si (KR)

(72) Inventors: Hyunsik Yu, Suwon-si (KR); Yunsik Kim, Suwon-si (KR); Junghoon Kim, Suwon-si (KR); Yeongjune Won, Suwon-si (KR); Heungsu Jeon, Suwon-si (KR); Sungoh Kim, Suwon-si (KR); Jiyoon Park, Suwon-si (KR); Wonseok Song, Suwon-si (KR); Jaemyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 17/649,388

(22) Filed: Jan. 31, 2022

(65) Prior Publication Data

US 2022/0159168 A1    May 19, 2022

Related U.S. Application Data

(63) Continuation of application No. PCT/KR2020/008119, filed on Jun. 24, 2020.

(30) Foreign Application Priority Data

Aug. 6, 2019    (KR) .......................... 10-2019-0095546

(51) Int. Cl.
*H04N 23/741*    (2023.01)
*G06T 5/50*    (2006.01)
(Continued)

(52) U.S. Cl.
CPC ............. *H04N 23/741* (2023.01); *G06T 5/50* (2013.01); *G06T 5/90* (2024.01); *G06V 40/16* (2022.01);
(Continued)

(58) Field of Classification Search
CPC ...... H04N 23/741; H04N 23/51; H04N 23/53; H04N 23/611; H04N 23/71; H04N 23/73;
(Continued)

(56) References Cited

U.S. PATENT DOCUMENTS

| 7,415,203 B2 | 8/2008 | Lee |
| 8,730,353 B2 | 5/2014 | Park et al. |

(Continued)

FOREIGN PATENT DOCUMENTS

| JP | 2008-048251 A | 2/2008 |
| JP | 2008-206111 A | 9/2008 |

(Continued)

OTHER PUBLICATIONS

International Search Report and Written Opinion of the International Searching Authority in connection with International Application No. PCT/KR2020/008119 issued Oct. 7, 2020, 12 pages.

(Continued)

*Primary Examiner* — Lin Ye
*Assistant Examiner* — Tuan H Le

(57) ABSTRACT

A method includes recognizing a face in a plurality of preview images. The method also includes setting a first exposure value of a first image such that a first brightness falls within a specified brightness range and the first brightness is of a first area including the face. The method further includes extracting a second brightness of an area excluding the first area. When the difference between the first brightness and the second brightness is greater than or equal to a specified value, the method includes adjusting exposure (Continued)

values of second and third images, which are a plurality of bracketing images having different exposures, as second and third exposure values, respectively. Additionally, the method includes synthesizing at least one of a bracketing image having a first exposure value, a second image, or a third image to generate a high dynamic range (HDR) image. The method includes displaying the HDR image.

20 Claims, 17 Drawing Sheets

(51) Int. Cl.
| | |
|---|---|
| *G06T 5/90* | (2024.01) |
| *G06V 40/16* | (2022.01) |
| *H04N 23/51* | (2023.01) |
| *H04N 23/53* | (2023.01) |
| *H04N 23/611* | (2023.01) |
| *H04N 23/71* | (2023.01) |
| *H04N 23/73* | (2023.01) |
| *H04N 23/743* | (2023.01) |

(52) U.S. Cl.
CPC ............ *H04N 23/51* (2023.01); *H04N 23/53* (2023.01); *H04N 23/611* (2023.01); *H04N 23/71* (2023.01); *H04N 23/73* (2023.01); *H04N 23/743* (2023.01); *G06T 2207/20208* (2013.01); *G06T 2207/20221* (2013.01)

(58) Field of Classification Search
CPC ........... H04N 23/743; G06T 5/50; G06T 5/90; G06T 2207/20208; G06T 2207/20221; G06T 2207/10144; G06T 2207/30201; G06T 5/00; G06V 40/16; G06V 10/14; G06V 10/16; G06V 10/17; G06V 40/161
See application file for complete search history.

(56) References Cited

U.S. PATENT DOCUMENTS

| | | | |
|---|---|---|---|
| 9,148,561 B2 * | 9/2015 | Kubota | ................... H04N 23/71 |
| 9,357,138 B2 | 5/2016 | Nashizawa | |
| 9,930,248 B2 * | 3/2018 | Bayani | ................... H04N 23/62 |
| 10,498,971 B2 | 12/2019 | Bagaria et al. | |
| 10,630,906 B2 | 4/2020 | Huang | |
| 10,832,386 B2 | 11/2020 | Sekine | |
| 2005/0271379 A1 | 12/2005 | Lee | |
| 2013/0002941 A1 | 1/2013 | Park et al. | |
| 2014/0022408 A1 | 1/2014 | Nashizawa | |
| 2018/0260941 A1 * | 9/2018 | Ma | ....................... H04N 23/743 |
| 2019/0073751 A1 * | 3/2019 | Sekine | ................... G06T 7/246 |
| 2019/0108388 A1 * | 4/2019 | Rivard | ................. G06V 10/758 |
| 2019/0138259 A1 * | 5/2019 | Bagaria | ................. G06F 3/1454 |
| 2020/0053265 A1 * | 2/2020 | Huang | ................... H04N 23/73 |
| 2021/0250564 A1 | 8/2021 | Pieri et al. | |

FOREIGN PATENT DOCUMENTS

| | | |
|---|---|---|
| JP | 2019-047336 A | 3/2019 |
| KR | 10-2006-0003390 A | 1/2006 |
| KR | 10-2013-0002699 A | 1/2013 |
| KR | 10-2014-0011943 A | 1/2014 |
| KR | 10-2021-0021062 A | 2/2021 |

OTHER PUBLICATIONS

Office Action issued May 21, 2024, in connection with Korean Patent Application No. 10-2019-0095546, 11 pages.

* cited by examiner

| FIRST RATIO | SECOND EXPOSURE VALUE |
|---|---|
| FIRST BOUNDARY VALUE OR ABOVE | FIRST CORRECTION VALUE |
| SECOND BOUNDARY VALUE OR ABOVE LESS THAN FIRST BOUNDARY VALUE | SECOND CORRECTION VALUE |
| 1 OR MORE AND LESS THAN SECOND BOUNDARY VALUE | THIRD CORRECTION VALUE |

FIG. 7

| SECOND RATIO | THIRD EXPOSURE VALUE |
|---|---|
| THIRD BOUNDARY VALUE OR ABOVE | FOURTH CORRECTION VALUE |
| FOURTH BOUNDARY VALUE OR ABOVE LESS THAN THIRD BOUNDARY VALUE | FIFTH CORRECTION VALUE |
| 1 OR MORE AND LESS THAN FOURTH BOUNDARY VALUE | SIXTH CORRECTION VALUE |

FIG.9

ELECTRONIC DEVICE FOR ADJUSTING EXPOSURE VALUE OF IMAGE INCLUDING FACE

CROSS-REFERENCE TO RELATED APPLICATIONS

This application is a bypass continuation of International Application No. PCT/KR2020/008119, filed Jun. 24, 2020, which claims priority to Korean Patent Application No. 10-2019-0095546, filed Aug. 6, 2019, the disclosures of which are herein incorporated by reference in their entirety.

BACKGROUND

1. Field

The disclosure relates to a technique for implementing an electronic device that adjusts an exposure value of an image including a face.

2. Description of Related Art

An electronic device may photograph an image by using a camera. The camera may obtain a preview image for pre-checking work when photographing an image and a bracketing image that is an image used for basic work for image processing. The camera may detect the face of a person in the image by using a face detection unit. The camera may perform automatic exposure (AE) to control the brightness of an image by calculating an exposure value (EV) of the entire image by using luminance information of a face area including a face.

Meanwhile, recent electronic devices may generate and display a high dynamic range (HDR) image. The HDR image may express both a low luminance region and a high luminance region, so that the user may visually perceive the image more clearly. The electronic device may set different exposure values of the bracketing images obtained through the camera. The electronic device may generate a high dynamic range image by synthesizing a plurality of bracketing images having different exposure values.

SUMMARY

The electronic device may control exposure or set an exposure value to generate an HDR image. When photographing an image including the face of a person, the electronic device may set an exposure value such that the face has a specified brightness range. However, when performing automatic exposure for calculating an exposure value, it may be difficult to consider the difference between the brightness of the face area and the brightness of the background area excluding the face area.

Accordingly, when photographing a backlight image in which the face of a person is behind an external light, the electronic device may increase the exposure value such that the face has a specified brightness range. When an HDR image is generated by using a bracketing image having an increased exposure value, a background saturation phenomenon may occur in which it is difficult to visually perceive the background area because the background area is too bright. When the exposure value is reduced to prevent background saturation, the face area may darken.

In addition, in a case where the background area is darker than the face area by a specified value or more, when the face is photographed to have a specified brightness range, the background area is dark so that it is difficult to visually perceive the background, and when the exposure value is increased to express the background area, the face area may be saturated.

Various embodiments disclosed in the disclosure are to provide an electronic device that displays a high dynamic range image in which the visibility of a background area is improved while the face area has a specified brightness range by adjusting the exposure value through a comparison between the brightness of the face area and the brightness of the background area.

According to an embodiment of the disclosure, an electronic device includes a housing including a first surface facing in a first direction and a second surface facing in a second direction opposite to the first surface, a display exposed in the first direction through the first surface of the housing, a camera at least partially exposed in the first direction through the first surface of the housing or at least partially exposed in the second direction through the second surface of the housing to photograph an image, and a processor operatively coupled to the display and the camera, wherein the processor may recognize a face among a plurality of preview images obtained for a task of identifying in advance when the camera photographs an image, set a first exposure value that is an exposure value of a first image that is a preview image having a basic exposure value among the plurality of preview images such that a first brightness, which is a brightness of a first area including the face, falls within a specified brightness range, extract the first brightness and a second brightness that is a brightness of a second area excluding the first area, adjust a second exposure value which is an exposure value of a second image which is a bracketing image having an exposure value smaller than an exposure value of the first image among a plurality of bracketing images which the camera obtains for use in a basic operation for image processing and/or a third exposure value of a third image which is a bracketing image having an exposure value greater than the exposure value of the first image when a difference between the first brightness and the second brightness is greater than or equal to a specified difference value, generate a high dynamic range (HDR) image by synthesizing a bracketing image having the first exposure value, the second image and/or the third image, and display the generated high dynamic range image on the display.

According to another embodiment of the disclosure, a method of adjusting, by a processor, an exposure value of an image including a face obtained by a camera of an electronic device including a display, includes recognizing a face among a plurality of preview images obtained for a task of identifying in advance when the camera photographs an image, setting a first exposure value that is an exposure value of a first image that is a preview image having a basic exposure value among the plurality of preview images such that a first brightness, which is a brightness of a first area including the face, falls within a specified brightness range, extracting the first brightness and a second brightness that is a brightness of a second area excluding the first area, adjusting a second exposure value which is an exposure value of a second image which is a bracketing image having an exposure value smaller than an exposure value of the first image among a plurality of bracketing images which the camera obtains for use in a basic operation for image processing and/or a third exposure value of a third image which is a bracketing image having an exposure value greater than the exposure value of the first image when a difference between the first brightness and the second brightness is greater than or equal to a specified difference value, generating a high dynamic range image by synthesizing a bracketing image having the first exposure value, the second image and/or the third image, and displaying the generated high dynamic range image on the display.

According to still another embodiment of the disclosure, there is provided a recording medium including a memory storing a plurality of instructions for implementing a method of adjusting, by a processor, an exposure value of an image including a face obtained by a camera of an electronic device including a display, wherein the plurality of instructions includes recognizing a face among a plurality of preview images obtained for a task of identifying in advance when the camera photographs an image, setting a first exposure value that is an exposure value of a first image that is a preview image having a basic exposure value among the plurality of preview images such that a first brightness, which is a brightness of a first area including the face, falls within a specified brightness range, extracting the first brightness and a second brightness that is a brightness of a second area excluding the first area, adjusting a second exposure value which is an exposure value of a second image which is a bracketing image having an exposure value smaller than an exposure value of the first image among a plurality of bracketing images which the camera obtains for use in a basic operation for image processing and/or a third exposure value of a third image which is a bracketing image having an exposure value greater than the exposure value of the first image when a difference between the first brightness and the second brightness is greater than or equal to a specified difference value, generating a high dynamic range image by synthesizing a bracketing image having the first exposure value, the second image and/or the third image, and displaying the generated high dynamic range image on the display.

According to the embodiments of the disclosure, when the difference between the brightness of the face area and the brightness of the background area is greater than or equal to the specified difference value, by selectively adjusting the second exposure value of the second image having an exposure value less than a basic exposure value and the third exposure value of the third image having an exposure value greater than the basic exposure value, it is possible to display a high dynamic range image in which the visibility of the background area is improved while the face area has a specified brightness range.

According to the embodiments of the disclosure, when the difference between the brightness of the face area and the brightness of the background area is large, it is possible to prevent the background from being saturated when taking a portrait photo.

In addition, various effects that are directly or indirectly understood through the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is a diagram illustrating a second exposure value according to a first ratio of a second image of an electronic device according to an embodiment.

FIG. 9 is a diagram illustrating a third exposure value according to a second ratio of a third image of an electronic device according to an embodiment.

With regard to description of drawings, the same or similar elements may be marked by the same or similar reference numerals.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
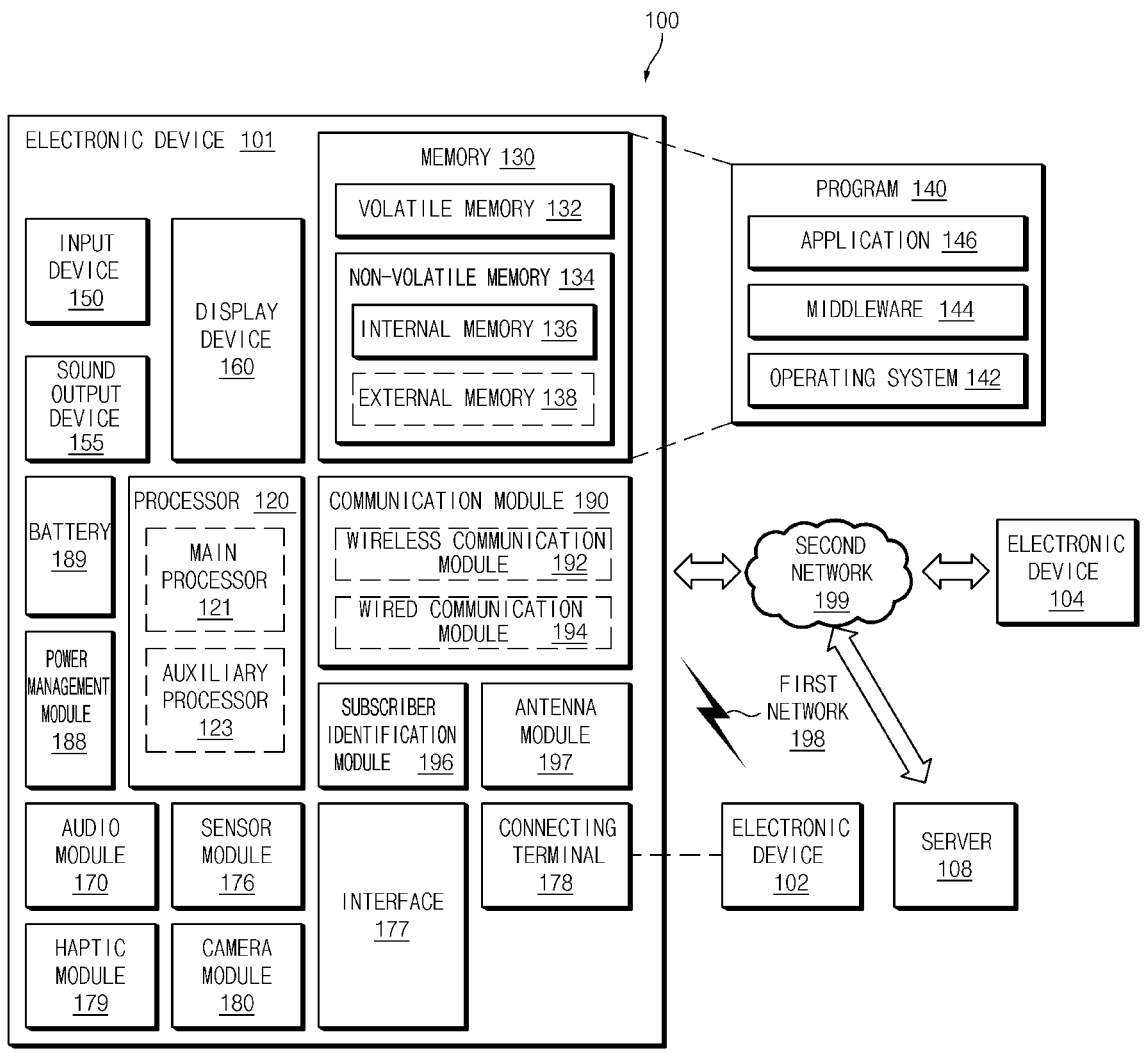
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may photograph a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
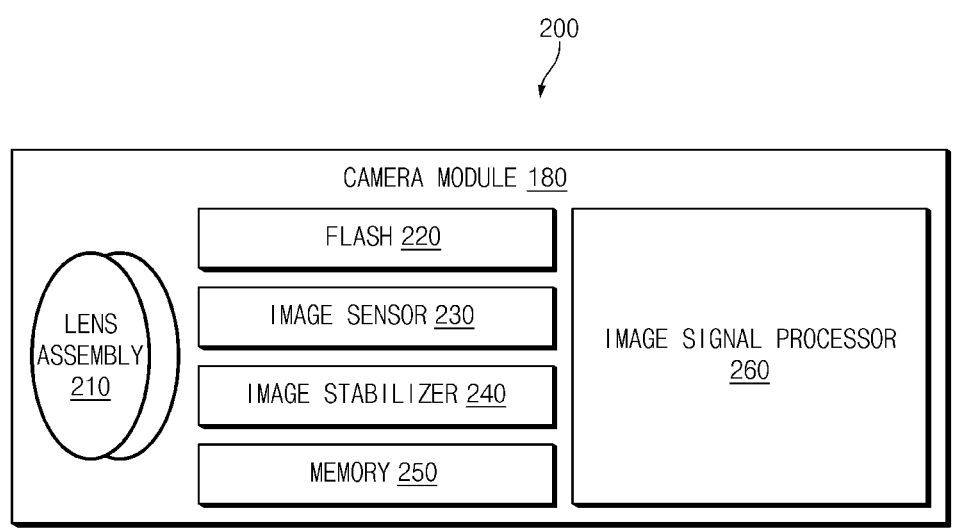
FIG. 2 is a block diagram illustrating the camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being photographed. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly photographed, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
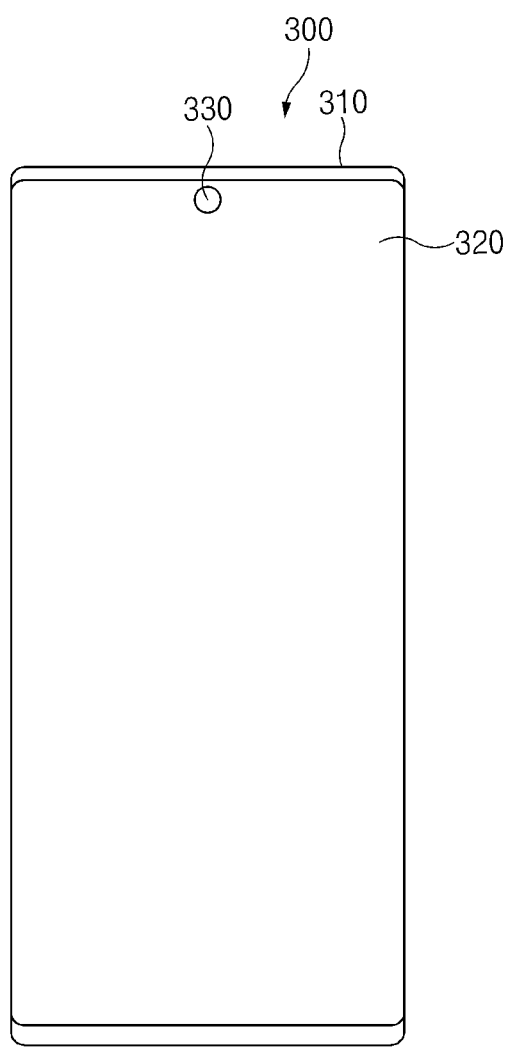
FIG. 3A is a view illustrating a front side of an electronic device according to an embodiment.
Figure 3B:
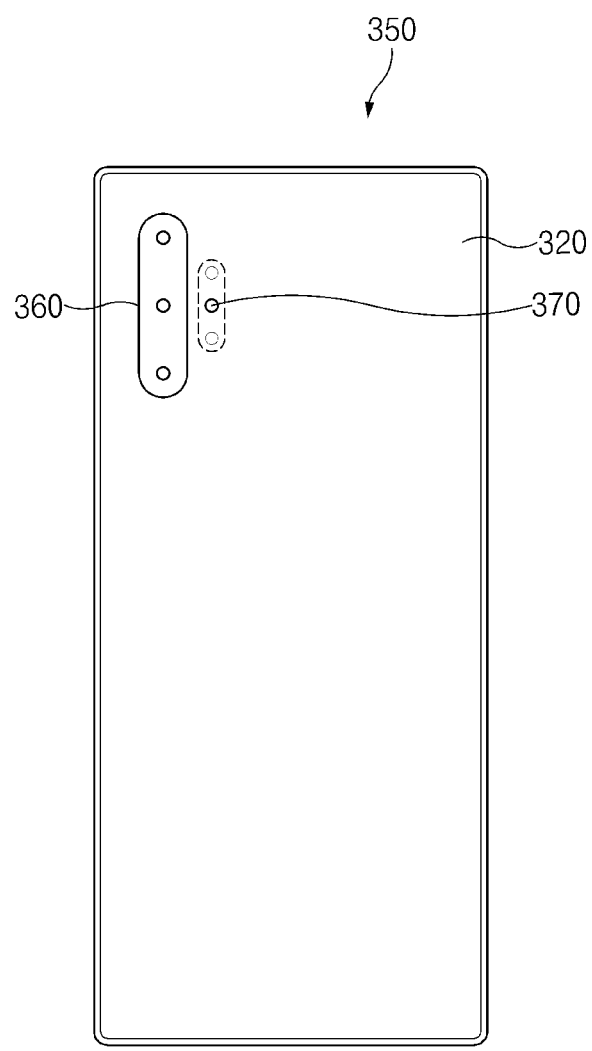
FIG. 3B is a view illustrating a rear side of the electronic device according to an embodiment.

FIG. 3A is a view 300 illustrating a front side of an electronic device (e.g., the electronic device 101 of FIG. 1) according to an embodiment. FIG. 3B is a view illustrating a rear side of the electronic device 101 according to an embodiment.

In an embodiment, the electronic device 101 may include a housing 310, a display 320, and cameras 330, 360, and 370.

In an embodiment, the housing 310 may include a first surface, a second surface and a third surface. The first surface may face in a first direction. The first direction may be a direction toward the front of the electronic device 101. As shown in FIG. 3A, the first surface may be formed of a transparent member such as glass or plastic on the front surface of the electronic device 101. The second surface may face in a second direction opposite to the first surface. As shown in FIG. 3B, the second surface may cover the entire rear surface of the electronic device 101. The third surface may connect the first surface and the second surface. The third surface may form a space inside the electronic device 101. As shown in FIGS. 3A and 3B, the third surface may be a side member formed in an edge area of the electronic device 101 to connect the first surface and the second surface. As another example, the third surface may be integrally formed with the second surface.

In an embodiment, the display 320 may be exposed in a first direction through the first surface of the housing 310. The display 320 may be included in a display device (e.g., the display device 160 of FIG. 1). The display 320 may display an image on the front surface of the electronic device 101.

In an embodiment, at least some of the cameras 330, 360, and 370 may be exposed in the first direction through the first surface of the housing 310 or in the second direction through the second surface of the housing 310. For example, the cameras 330, 360, and 370 may include the front camera 330 arranged on the front of the electronic device 101 and the rear cameras 360 and 370 arranged on the back of the electronic device 101. The cameras 330, 360, and 370 may photograph images.

In an embodiment, a processor (e.g., the processor 120 of FIG. 1) may be operationally connected to the display 320 and the cameras 330, 360, and 370. The processor 120 may receive image signals related to images photographed by the cameras 330, 360, and 370. The processor 120 may display an image on the display 320 based on the image signals received from the cameras 330, 360, and 370.

In an embodiment, the cameras 330, 360, and 370 may obtain a plurality of bracketing images when photographing one image. Exposure values (EV) of the plurality of bracketing images may be different from each other. The plurality of bracketing images may be low dynamic range (LDR) images. The processor 120 may generate a high dynamic range (HDR) image by synthesizing the plurality of bracketing images. The display 320 may display the high dynamic range image generated by the processor 120.

Figure 4:
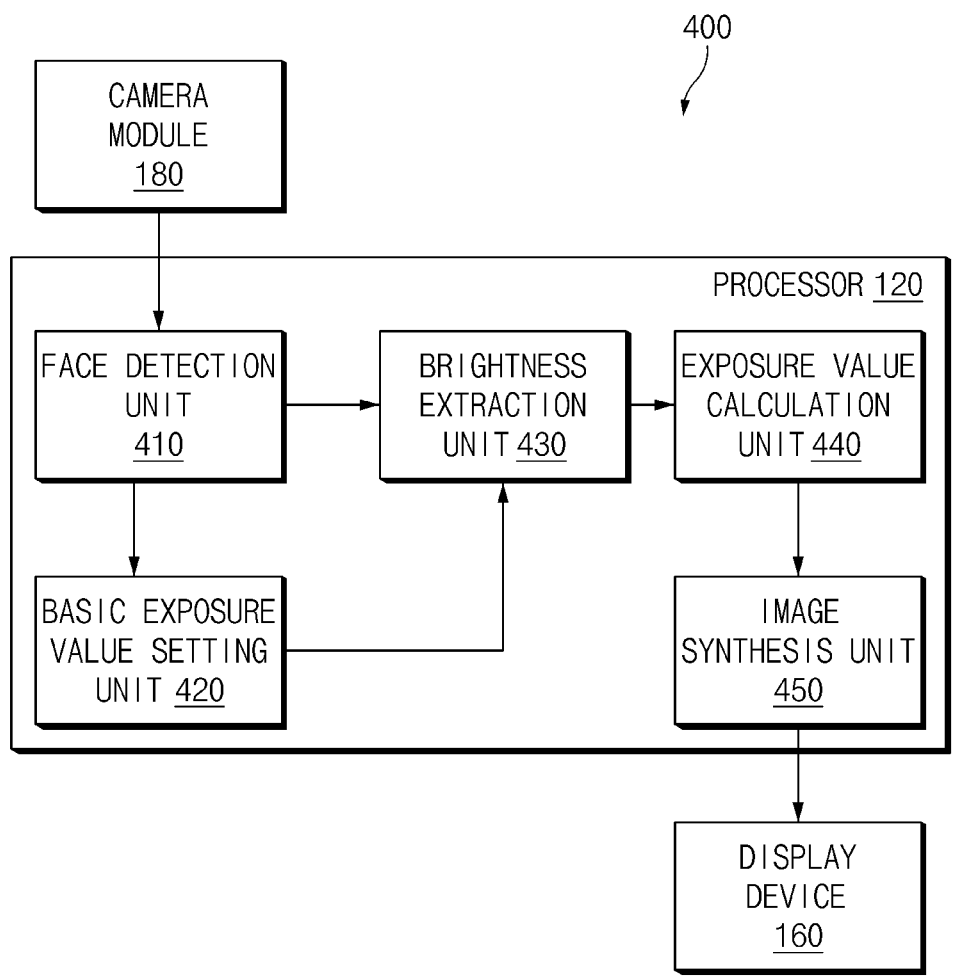
FIG. 4 is a block diagram illustrating an electronic device for adjusting an exposure value of an image including a face according to an embodiment.

FIG. 4 is a block diagram 400 illustrating an electronic device (e.g., the electronic device 101 of FIG. 1) for adjusting an exposure value of an image including a face according to an embodiment.

In an embodiment, the electronic device 101 may include the camera module 180 for photographing an image including a face, the processor 120 for adjusting an exposure value of the image, and the display device 160 for displaying an image with the adjusted exposure value.

In an embodiment, the camera module 180 may transmit a plurality of bracketing images including a face to the processor 120. For example, an image sensor (e.g., the image sensor 230 of FIG. 2) of the camera module 180 may obtain a plurality of bracketing images including the face of a person while photographing an outside. The image sensor 230 may transmit a plurality of bracketing images to an image signal processor (e.g., the image signal processor 260 of FIG. 2). The image signal processor 260 may generate an image signal by using a plurality of received bracketing images. The image signal processor 260 may transmit the generated image signal to the processor 120.

In an embodiment, the processor 120 may include a face detection unit 410, a basic exposure value setting unit 420, a brightness extraction unit 430, an exposure value calculation unit 440, and an image synthesis unit 450.

In an embodiment, the face detection unit 410 may receive an image signal including a plurality of bracketing images from the camera module 180 to obtain the plurality of bracketing images. The face detection unit 410 may detect a face area from the plurality of obtained bracketing images. The face detection unit 410 may recognize the face of a person from the plurality of obtained bracketing images and detect a periphery of the face as a face area.

In detail, the face detection unit 410 may extract a skin color area from a plurality of bracketing images. The face detection unit 410 may determine a boundary line in which brightness is changed in the extracted skin color area as an outline of the face. The face detection unit 410 may determine whether both eyes and the mouth exist in positions where both eyes and the mouth of a person are generally located in the area inside the outline of the face. When two eyes and a mouth are present, the face detection unit 410 may detect an area defined as a rectangle by summing the area inside the outline of the face and the area around the outline of the face as the face area. However, the embodiments are not limited thereto, and the face detection unit 410 may detect a partial area including the face of a person in the plurality of bracketing images as the face area by using various schemes.

In an embodiment, the basic exposure value setting unit 420 may set a basic exposure value. The basic exposure value may be an exposure value that may make the brightness of the face in a preview image to specified brightness. The basic exposure value setting unit 420 may measure the brightness of the face area and set the basic exposure value such that the face has appropriate face brightness. For example, when a gray level, which is one of pixel brightness values, is about 140, the brightness of the face may be the appropriate brightness of the face. The basic exposure value setting unit 420 may set the exposure value of the bracketing image, which is the standard for the brightness of the high dynamic range image among the plurality of bracketing images, to 0 (zero) EV when the exposure value that sets the brightness of the face area to the appropriate face brightness is 0 (zero) EV. As another example, when the face of a person is darker than the background due to backlighting, and the exposure value that sets the brightness of the face area to the appropriate face brightness is +EV, which is a value greater than 0 (zero) EV, the basic exposure value setting unit 420 may set the exposure value of the bracketing image, which is the standard for the brightness of the high dynamic range image among the plurality of bracketing images, to +EV.

In an embodiment, the brightness extraction unit 430 may extract brightness information of the detected face area and brightness information of the entire image or an area excluding the face area from the image. For example, the brightness extraction unit 430 may extract an average value of brightness of the face area and an average value of brightness of the entire image. As another example, the brightness extraction unit 430 may extract an average value of brightness of a face area and an average value of brightness of an area excluding the face area from the image. As still another example, the brightness extraction unit 430 may extract the brightness of the face area and the brightness of a portion of the area excluding the face area from the image. However, the embodiments are not limited thereto, and in order to extract the second brightness, the brightness extraction unit 430 may extract all brightness of a first area (e.g., a first area 610 of FIG. 6) which is a face area and a second area (e.g., a second area 620 of FIG. 6) in order to extract the second brightness, or may extract the brightness of a partial area having a brightness outside a specified range of the second area 620. Accordingly, the brightness extraction unit 430 may induce the exposure value calculation unit 440 to calculate a correct exposure value that allows a portion that is not easily visible to the user, such as saturation, to be visually perceived.

In an embodiment, the exposure value calculation unit 440 may compare the brightness of the face area with the brightness of the entire image or the brightness of an area excluding the face area from the image. The exposure value calculation unit 440 may adjust the exposure value of at least one bracketing image among the bracketing images except for the bracketing images having a basic exposure value among the plurality of bracketing images. For example, when the basic exposure value is applied and background saturation occurs in which the background becomes too bright, the exposure value calculation unit 440 may further reduce the exposure value of the bracketing image having an exposure value lower than the basic exposure value among the plurality of bracketing images. As another example, when the basic exposure value is applied and the background is too dark so that it is not easy for the user to recognize the background, the exposure value calculation unit 440 may increase the exposure value of the bracketing image having an exposure value higher than the basic exposure value among the plurality of bracketing images.

In an embodiment, the image synthesis unit 450 may synthesize a plurality of bracketing images having different exposure values. The image synthesis unit 450 may spatially synthesize a plurality of bracketing images. The image synthesis unit 450 may synthesize bracketing images having exposure values higher than the basic exposure value and/or exposure values lower than the basic exposure value to the bracketing image having the basic exposure value. For example, the image synthesis unit 450 may synthesize a bracketing image having an exposure value lower than the basic exposure value among a plurality of bracketing images in a high luminance area of the bracketing image having the basic exposure value. As another example, the image synthesis unit 450 may synthesize a bracketing image having an exposure value higher than the basic exposure value among a plurality of bracketing images in a low luminance area of the bracketing image having the basic exposure value.

In an embodiment, the image synthesis unit 450 may generate a high dynamic range image by synthesizing a plurality of bracketing images. The image synthesis unit 450 may transmit the generated high dynamic range image to the display device 160.

Figure 5:
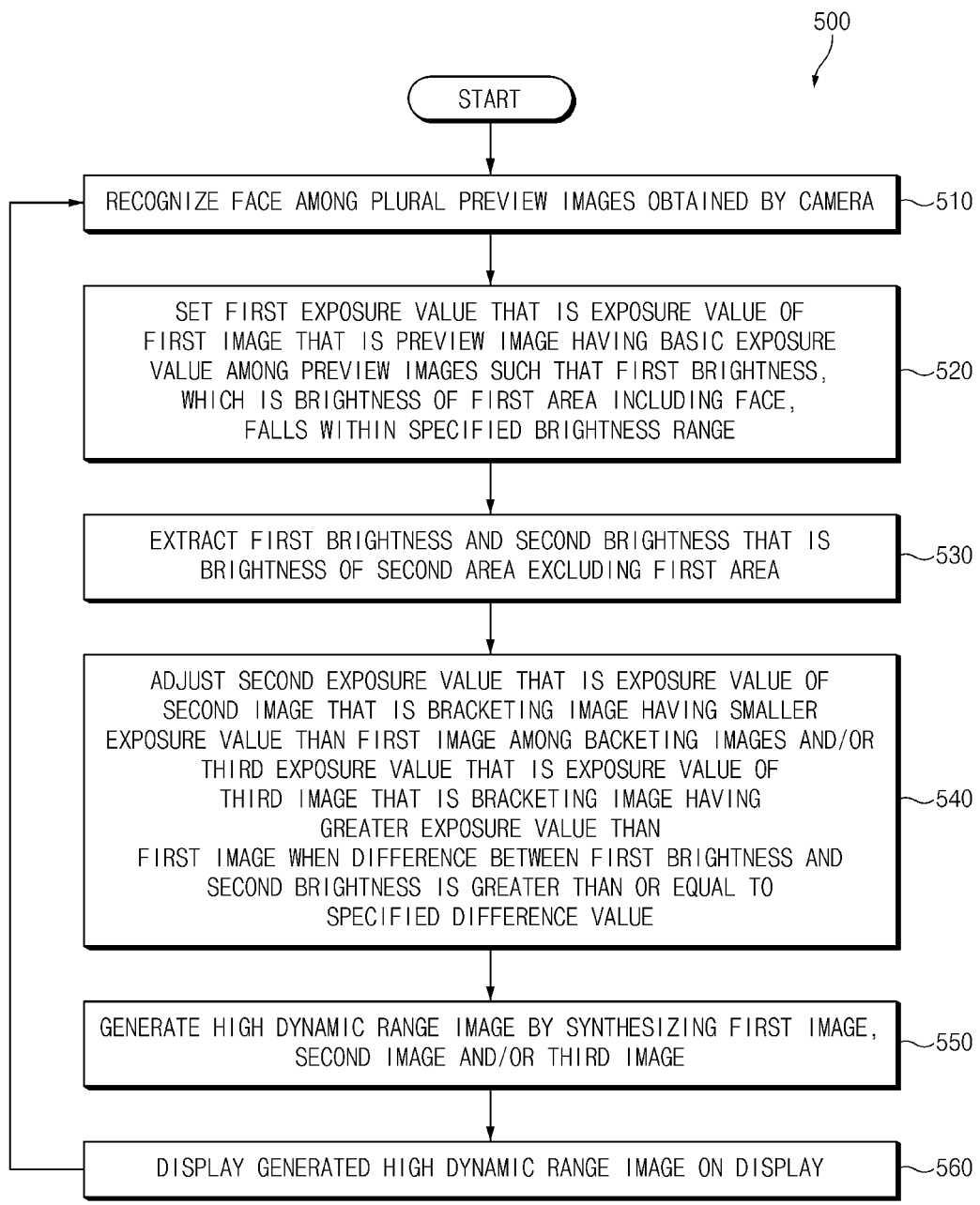
FIG. 5 is a flowchart illustrating a method of adjusting an exposure value of an image including a face according to an embodiment.

FIG. 5 is a flowchart 500 illustrating a method of adjusting an exposure value of an image including a face according to an embodiment.

In an electronic device (e.g., the electronic device 101 of FIG. 1) according to an embodiment, in operation 510, a face may be recognized from among a plurality of preview images obtained for a pre-checking operation when a camera (e.g., the cameras 330, 360, and 370 of FIGS. 3A and 3B) photographs an image. A processor (e.g., the processor 120 of FIG. 4) of the electronic device 101 may detect a face in each of the plurality of preview images by using a face detection unit (e.g., the face detection unit 410 of FIG. 4).

In operation 520, the electronic device 101 may set the first exposure value that is an exposure value of the first image that is the preview image having the basic exposure value among the plurality of preview images such that the first brightness, which is the brightness of the first area including a face, falls within a specified brightness range. The processor 120 of the electronic device 101 may set the first image as the first brightness such that the face has an appropriate brightness. The processor 120 may set the first exposure value such that the first image has the first brightness by using a basic exposure value setting unit (e.g., the basic exposure value setting unit 420 of FIG. 4). For example, the basic exposure value setting unit 420 may set the first exposure value to 0 EV such that the first image has about 140 gray levels.

In operation 530, the electronic device 101 according to an embodiment may extract the first brightness and the second brightness that is the brightness of the second area excluding the first area. The second area may be a background area that is an area excluding the face area. The processor 120 of the electronic device 101 may separately extract the first brightness and the second brightness. For example, the processor 120 may extract the average brightness value of the first area as the first brightness by using a brightness extraction unit (e.g., the brightness extraction unit 430 of FIG. 4) and extract the average brightness value of the second area as the second brightness. As another example, the brightness extraction unit 430 may extract an average brightness value of the entire area including the first area and the second area as the second brightness. As still another example, the brightness extraction unit 430 may extract a brightness value of a portion of the second area as the second brightness.

In operation 540, when the difference between the first brightness and the second brightness is greater than or equal to a specified difference value, the electronic device 101 according to an embodiment may adjust the second exposure value which is an exposure value of the second image which is the bracketing image having a smaller exposure value than the first image, among the plurality of bracketing images that the cameras 330, 360, and 370 obtain for use in basic work for processing an image, and/or the third exposure value which is an exposure value of the third image which is a bracketing image having an exposure value greater than that of the first image. When the difference between the first brightness and the second brightness is equal to or greater than a specified difference value, the processor 120 of the electronic device 101 may determine that the brightness difference between the face area and the background area is excessive. When proceeding synthesis for generating a high dynamic range image while maintaining the exposure value in a state where the brightness difference between the face area and the background area is excessive, the background may be saturated when the background area is bright, and it may be difficult to properly recognize the background area when the background area is dark.

In an embodiment, an exposure value calculation unit of the processor 120 (e.g., the exposure value calculation unit 440 of FIG. 4) may maintain the first exposure value and the third exposure constant and decrease the second exposure value when the second brightness is brighter than the first brightness. The exposure value calculation unit 440 may reduce the second exposure value to prevent the background image from becoming too bright.

In an embodiment, when the second brightness is lower than the first brightness, the exposure value calculation unit 440 may keep the first exposure value and the second exposure value constant and increase the third exposure value. The exposure value calculation unit 440 may increase the third exposure value to prevent the background image from becoming too dark.

In operation 550, the electronic device 101 according to an embodiment may synthesize the bracketing image having the first exposure value and the second image and/or the third image to obtain an HDR image. The processor 120 of the electronic device 101 may selectively synthesize the second image and/or the third image into the bracketing image having the first exposure value according to the second brightness of the bracketing image having the basic exposure value. For example, an image synthesis unit (e.g., the image synthesis unit 450 of FIG. 4) of the processor 120 may synthesize the bracketing image having the first exposure value and the second image when the second area is brighter than the first area. As another example, when the second area is darker than the first area, the image synthesis unit 450 may synthesize the bracketing image having the first exposure value and the third image. As another example, when both a portion brighter than the first brightness by a specified difference value and a portion darker than a specified difference value exist in the second area, the image synthesis unit 450 may synthesize the bracketing image having the first exposure value, the second image and the third image.

In operation 560, the electronic device 101 according to an embodiment may display the generated HDR image on a display (e.g., the display 320 of FIG. 3A). In the HDR image, the face may be displayed at an appropriate brightness because the basic exposure value has the first brightness to which the first exposure value is applied in the first area including the face. At the same time, the exposure value may be adjusted in the second area except for the first area. When the exposure value of the second area is adjusted, it is possible to prevent a phenomenon in which the background is saturated because the background is too bright or, to the contrary, the background is difficult to be recognized because the background is too dark.

Figure 6:
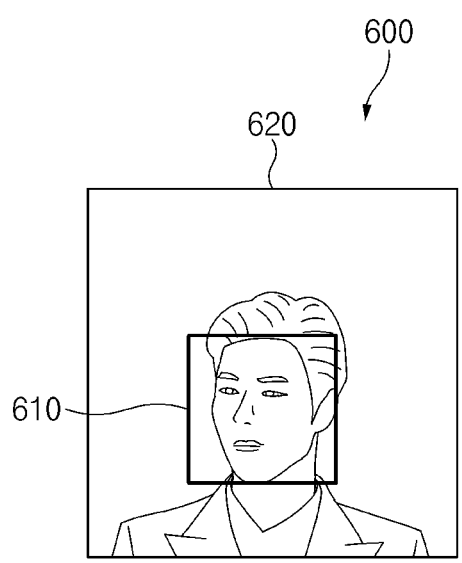
FIG. 6 is a diagram illustrating an operation of recognizing a face by an electronic device according to an embodiment.

FIG. 6 is a diagram 600 illustrating an operation of recognizing a face by an electronic device (e.g., the electronic device 101 of FIG. 1) according to an embodiment.

In an embodiment, the electronic device 101 may photograph an image including the face of a person by using cameras (e.g., the cameras 330, 360, and 370 of FIGS. 3A and 3B). The electronic device 101 may display a preview image for checking an image to be photographed on a display (e.g., the display 320 of FIG. 3A).

In an embodiment, the processor 120 of the electronic device 101 may obtain a plurality of bracketing images having different exposure values per one frame. For example, the processor 120 may obtain a first image having the first exposure value that is a reference exposure value, a second image that is a bracketing image having the second exposure value that is smaller than the first exposure value, and a third image that is a bracketing image having the third exposure value that is an exposure value greater than the first exposure value.

In an embodiment, the processor 120 may detect a face in a preview image and set a first area 610 that is an area including the face and a second area 620 excluding the first area 610. The processor 120 may detect the face in the preview image by using a face detection unit (e.g., the face detection unit 410 of FIG. 4). The processor 120 may transmit information related to the first area 610 and the second area 620 to the display 320. The display 320 may display the first area 610 separately from the second area 620. For example, as shown in FIG. 6, the display 320 may display the first area 610 as a rectangular box area in the preview image to notify the user that the face area has been detected.

In an embodiment, when the first area 610 including a face is detected, the processor 120 may set a basic exposure value such that the face is expressed with brightness within a specified brightness range. In the case where the brightness is increased when the face is expressed with brightness within the specified brightness range, the face may be more easily recognized by the user who views the image. Accordingly, the basic exposure value setting unit (e.g., the basic exposure value setting unit 420 of FIG. 4) of the processor 120 may increase the first exposure value, which is the basic exposure value, by a preset value when the first area 610 is detected. For example, the basic exposure value setting unit 420 of the processor 120 may increase the first exposure value from 0 EV to +EV when the first area 610 is detected.

In an embodiment, when the first area 610 including a face is detected, the processor 120 may extract the first brightness and the second brightness. For example, a brightness extraction unit (e.g., the brightness extraction unit 430 of FIG. 4) of the processor 120 may calculate an average value of the brightness of each pixel as the first brightness after extracting the brightness from each pixel arranged in the first area 610, and calculate an average value of the brightness of each pixel as the second brightness after extracting the brightness of each pixel arranged in the second area 620. As another example, the brightness extraction unit 430 may extract the brightness of each pixel arranged in both the first area 610 and the second area 620 and then calculate the average value of the brightness of each pixel as the second brightness. As still another example, the brightness extraction unit 430 may extract, as the second brightness, the brightness of pixels arranged in a partial area including a pixel having the maximum brightness value or minimum brightness value among the second area 620. The brightness extraction unit 430 may extract, as the second brightness, the brightness of pixels arranged in a partial area including the pixel having the maximum brightness value or the minimum brightness value, so that the second brightness is set to sufficiently reflect a portion having the maximum brightness value or the minimum brightness value in the second area 620.

In an embodiment, the brightness extraction unit 430 of the processor 120 may compare the first brightness and the second brightness. When the difference between the first brightness and the second brightness is greater than or equal to a specified difference value, the brightness extraction unit 430 may transmit the first brightness, the second brightness and/or the difference value between the first brightness and the second brightness to an exposure value calculation unit (e.g., the exposure value calculation unit 440 of FIG. 4). The exposure value calculation unit 440 may be set to adjust the exposure values of the second image and/or the third image when the difference between the first brightness and the second brightness is greater than or equal to a specified difference value.

Figure 8:
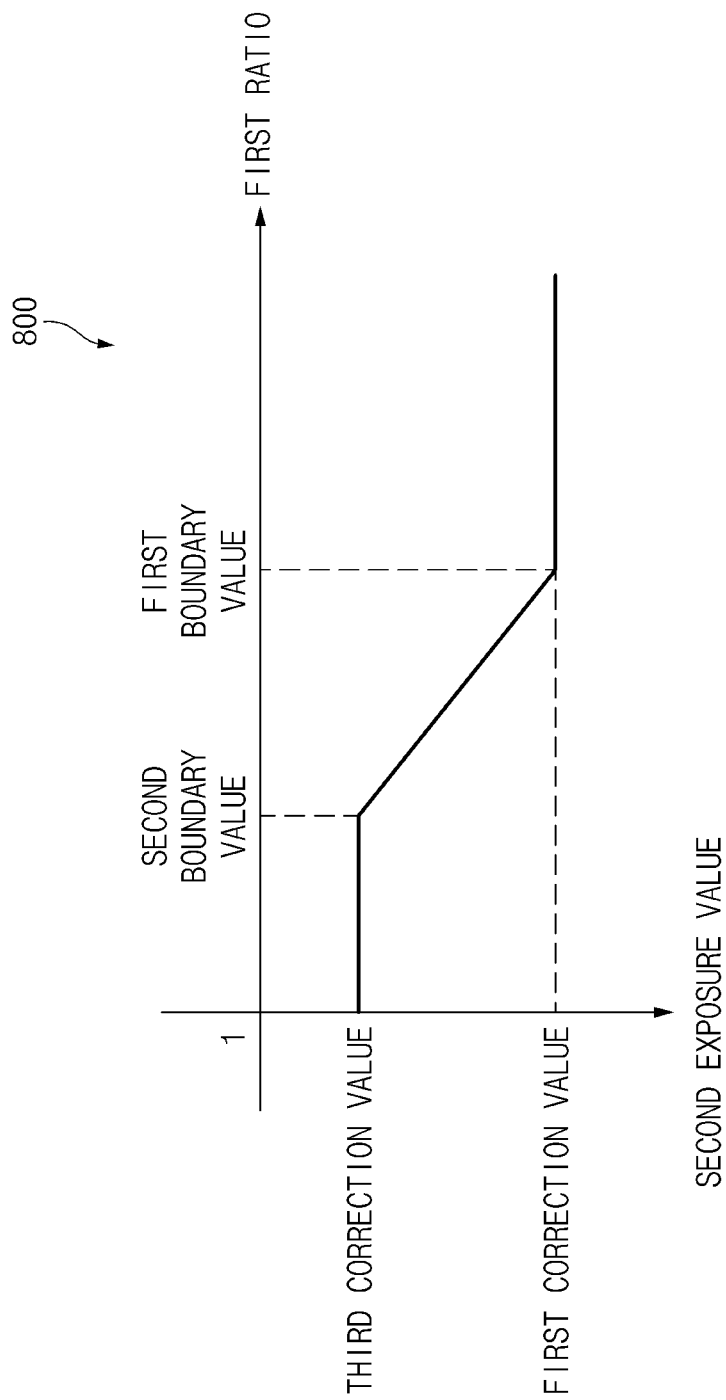
FIG. 8 is a diagram illustrating a second exposure value according to a first ratio of a second image of an electronic device according to another embodiment.
Figure 10:
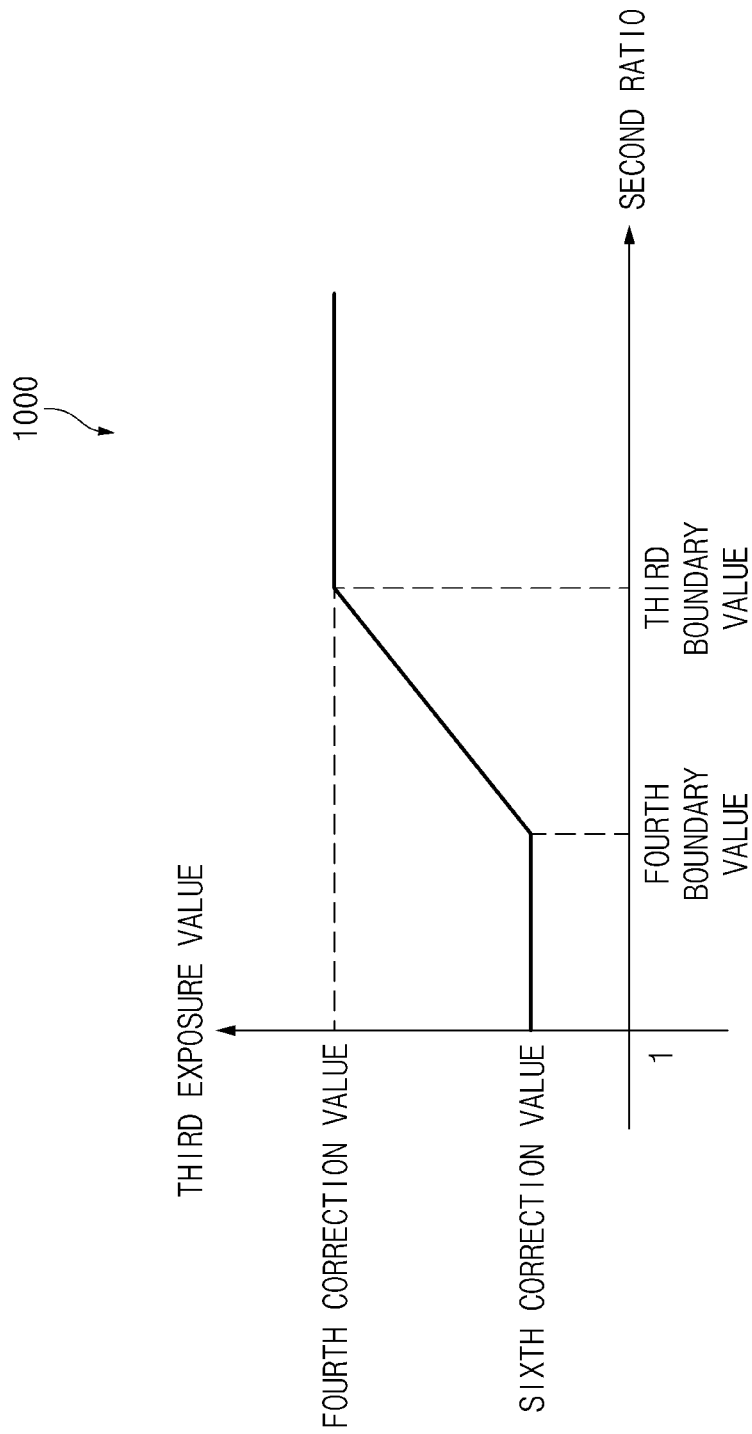
FIG. 10 is a diagram illustrating a third exposure value according to a second ratio of a third image of an electronic device according to another embodiment.

In an embodiment, when the second brightness is brighter than the first brightness, the exposure value calculation unit 440 may be set to maintain the first exposure value and the third exposure value and adjust the second exposure value of the second image. The exposure value calculation unit 440 may be set to maintain the first exposure value and the second exposure value and adjust the third exposure value of the third image when the second brightness is darker than the first brightness. When the second brightness is brighter than the first brightness, the second exposure value may be adjusted as shown in FIGS. 7 and 8. When the second brightness is darker than the first brightness, the third exposure value may be adjusted as shown in FIGS. 9 and 10.

FIG. 7 is a diagram illustrating a second exposure value according to a first ratio of a second image of an electronic device (e.g., the electronic device 101 of FIG. 1) according to an embodiment. In FIG. 7, because the first exposure value and the third exposure value are maintained, the exposure values of the first image and the third image may be maintained. For example, the first exposure value may be maintained at 0 EV and the third exposure value may be maintained at +EV.

In an embodiment, the processor (e.g., the processor 120 of FIG. 1) of the electronic device 101 may adjust the second exposure value according to the first ratio. The first ratio may be the ratio of the second brightness to the first brightness. For example, the first ratio may be second brightness/first brightness. When the second brightness is brighter than the first brightness, the first ratio may have a value greater than '1'.

In an embodiment, an exposure value calculation unit (e.g., the exposure value calculation unit 440 of FIG. 4) of the processor 120 may set the second exposure value to a first correction value when the first ratio is equal to or greater than a first boundary value. The first boundary value may be a value of '1' or more. The first correction value may be a value smaller than the first exposure value. The exposure value calculation unit 440 may set the second exposure value to a second correction value when the first ratio is less than the first boundary value and greater than or equal to a second boundary value. The second boundary value may be a value smaller than the first boundary value and equal to or greater than '1'. The second correction value may be greater than the first correction value and less than the first exposure value. The exposure value calculation unit 440 may set the second exposure value as a third correction value when the first ratio is '1' or more and less than the second boundary value. The third correction value may be greater than the second correction value and less than the first exposure value.

In an embodiment, the exposure value calculation unit 440 may set the first boundary value to '3' and set the second boundary value to '2'. When the first exposure value is set to 0 EV by the basic exposure value setting unit (e.g., the basic exposure value setting unit 420 of FIG. 4), the exposure value calculation unit 440 may set the first correction value to −4 EV, the second correction value to −3 EV, and the third correction value to −2 EV.

In an embodiment, the exposure value calculation unit 440 may calculate the first ratio by using the first brightness and the second brightness measured by the brightness extraction unit (e.g., the brightness extraction unit 430 of FIG. 4) and set the second exposure value to the first correction value, the second correction value and/or the third correction value according to the first ratio. For example, when the brightness extraction unit 430 extracts the first brightness of the first area 610 as 100 lx and extracts the second brightness of the second area 620 as 350 lx, the ratio of the second brightness to the first brightness may be 3.5. Accordingly, the first ratio may be 3.5, which may be greater than the first boundary value. In this case, the exposure value calculation unit 440 may set the second exposure value to −4 EV that is the first correction value. As another example, when the brightness extraction unit 430 extracts the first brightness as 100 lx and the second brightness as 250 lx, the ratio of the second brightness to the first brightness may be 2.5. Accordingly, the first ratio becomes 2.5, which may be smaller than the first boundary value and greater than the second boundary value. In this case, the exposure value calculation unit 440 may set the second exposure value to −3 EV that is the second correction value. As still another example, when the brightness extraction unit 430 extracts the first brightness as 100 lx and the second brightness as 150 lx, the ratio of the second brightness to the first brightness may be 1.5. Accordingly, the first ratio may be 1.5, which may be smaller than the second boundary value and greater than '1'. In this case, the exposure value calculation unit 440 may set the second exposure value to −2 EV that is the third correction value.

FIG. 8 is a diagram 800 illustrating a second exposure value according to a first ratio of a second image of an electronic device (e.g., the electronic device 101 of FIG. 1) according to another embodiment. In FIG. 8, because the first exposure value and the third exposure value are maintained, the exposure values of the first image and the third image may be maintained. For example, the first exposure value may be maintained at 0 EV and the third exposure value may be maintained at +EV.

In an embodiment, the exposure value calculation unit (e.g., the exposure value calculation unit 440 of FIG. 4) of the processor 120 may set the second exposure value to the first correction value when the first ratio, which is the ratio of the second brightness to the first brightness, is greater than or equal to the first boundary value. The exposure value calculation unit 440 may increase the second exposure value as the first ratio decreases, when the first ratio is less than the first boundary value and equal to or greater than the second boundary value and the second boundary value is smaller than the first boundary value. The exposure value calculation unit 440 may set the second exposure value to the third correction value that is greater than the first correction value and smaller than the first exposure value when the first ratio is less than the second boundary value or equal to or greater than '1'.

In an embodiment, the exposure value calculation unit 440 may linearly increase the second exposure value as the first ratio decreases when the first ratio is less than the first boundary value and greater than or equal to the second boundary value. For example, the exposure value calculation unit 440 may linearly increase the second exposure value from the first correction value to the third correction value when the first ratio changes from the first boundary value to the second boundary value. The second exposure value may be a value indicating an amount of light per unit area used to display the second image in a specified brightness range. The exposure value calculation unit 440 may change the second exposure value in response to the change of the first ratio to adjust the amount of light such that the second image is displayed in a specified brightness range. Accordingly, it is possible to set the second exposure value within a range greater than or equal to the first boundary value that is the maximum threshold value of the first ratio and the second boundary value that is the minimum threshold value of the first ratio.

In an embodiment, when the second exposure value increases by a unit value, the amount of light may increase by a factor of 2. For example, when the second exposure value is changed from −2 EV to −EV, the amount of light may increase by a factor of 2. As another example, when the second exposure value is changed from −3 EV to −EV, the amount of light may increase by a factor of 4. Accordingly, when the second exposure value is linearly changed, the brightness of the second image may change exponentially. The exposure value calculation unit 440 may exponentially increase the brightness of the second image as the first ratio decreases when the first ratio is less than the first boundary value and greater than or equal to the second boundary value.

In an embodiment, the exposure value calculation unit 440 may set the second exposure value by using a specified calculation formula. The specified calculation formula may be designed to adjust the second exposure value as shown in FIG. 8. For example, the specified calculation formula may be expressed as follows.

tempEV=SCALE*{FIRST RATIO-THRESHOLD}+ MIN_EV

If tempEV>MAX_EV,Under_EV=−MAX_EV

Else if tempEV<MIN_EV,Under_EV=−MIN_EV

Else Under_EV=−tempEV

When matching this formula to FIG. 8, Under_EV may be the second exposure value. In addition, −MAX_EV may be the first correction value and −MIN_EV may be the third correction value. In addition, when the first ratio is less than the first boundary value and greater than or equal to the second boundary value, it may be understood that as the first ratio changes, tempEV is linearly calculated according to SCALE, which is a specified slope, and a negative value is applied as the Under_EV value.

In an embodiment, when the specified calculation formula is used, the second exposure value corresponding to the first ratio may be easily set. For example, when SCALE=1, THRESHOLD=2, MAX_EV=4, and MIN_EV=1 in the above specified calculation formula, and when the second brightness, which is the brightness of the second area (e.g., the second area 620 in FIG. 6), is three times the brightness of the first area (e.g., the first area 610 of FIG. 6), it is possible to easily calculate tempEV and Under_EV as follows.

tempEV=1*(3−2)+2=3,Under_EV=−3EV

FIG. 9 is a diagram illustrating a third exposure value according to a second ratio of a third image of an electronic device (e.g., the electronic device 101 of FIG. 1) according to an embodiment. In FIG. 9, because the first exposure value and the second exposure value are maintained, the exposure values of the first image and the second image may be maintained. For example, the first exposure value may be maintained at 0 EV and the second exposure value may be maintained at −2 EV.

In an embodiment, the processor (e.g., the processor 120 of FIG. 1) of the electronic device 101 may adjust the third exposure value according to the second ratio. The second ratio may be a ratio of the first brightness to the second brightness. For example, the second ratio may be first brightness/second brightness. When the second brightness is darker than the first brightness, the second ratio may have a value greater than '1'.

In an embodiment, an exposure value calculation unit (e.g., the exposure value calculation unit 440 of FIG. 4) of the processor 120 may set the third exposure value to a fourth correction value when the second ratio is equal to or greater than a third boundary value. The third boundary value may be a value of '1' or more. The fourth correction value may be greater than the first exposure value. The exposure value calculation unit 440 may set the third exposure value to a fifth correction value when the second ratio is less than the third boundary value and greater than or equal to a fourth boundary value. The fourth boundary value may be a value smaller than the third boundary value and greater than or equal to '1'. The fifth correction value may be smaller than the fourth correction value and greater than the first exposure value. The exposure value calculation unit 440 may set the third exposure value to a sixth correction value when the second ratio is equal to or greater than '1' and less than the fourth boundary value. The sixth correction value may be smaller than the fifth correction value and greater than the first exposure value.

In an embodiment, the exposure value calculation unit 440 may set the third boundary value to '4', and set the fourth boundary value to '3'. When the first exposure value is set to 0 EV by the basic exposure value setting unit (e.g., the basic exposure value setting unit 420 of FIG. 4), the exposure value calculation unit 440 may set the fourth correction value to +3 EV, the fifth correction value to +2 EV, and the sixth correction value to +1 EV.

In an embodiment, the exposure value calculation unit 440 may calculate the second ratio by using the first brightness and the second brightness measured by the brightness extraction unit (e.g., the brightness extraction unit 430 of FIG. 4) and set the third exposure value as the fourth correction value, the fifth correction value and/or the sixth correction value according to the second ratio. For example, when the brightness extraction unit 430 extracts the first brightness of the first area 610 as 150 lx and extracts the second brightness of the second area 620 as 30 lx, the ratio of the first brightness to the second brightness may be '5'. Accordingly, the second ratio may be '5', which may be greater than the third boundary value. In this case, the exposure value calculation unit 440 may set the third exposure value to +3 EV that is the third correction value. As another example, when the brightness extraction unit 430 extracts the first brightness as 150 lx and the second brightness as 40 lx, the ratio of the first brightness to the second brightness may be 3.75. Accordingly, the second ratio becomes 3.75, which may be smaller than the third boundary value and greater than the fourth boundary value. In this case, the exposure value calculation unit 440 may set the third exposure value to +2 EV that is the fifth correction value. As still another example, when the brightness extraction unit 430 extracts the first brightness as 150 lx and the second brightness as 60 lx, the ratio of the first brightness to the second brightness may be 2.5. Accordingly, the second ratio may be 2.5, which may be smaller than the fourth boundary value and greater than '1'. In this case, the exposure value calculation unit 440 may set the third exposure value to +1 EV that is the sixth correction value.

FIG. 10 is a diagram illustrating a third exposure value according to a second ratio of a third image of an electronic device according to another embodiment. In FIG. 10, because the first exposure value and the second exposure value are maintained, the exposure values of the first image and the second image may be maintained. For example, the first exposure value may be maintained at 0 EV and the second exposure value may be maintained at −2 EV.

In an embodiment, the exposure value calculation unit (e.g., the exposure value calculation unit 440 of FIG. 4) of the processor 120 may set the third exposure value to the fourth correction value when the second ratio, which is the ratio of the first brightness to the second brightness, is greater than or equal to the third boundary value. The exposure value calculation unit 440 may decrease the third exposure value as the second ratio decreases, when the second ratio is less than the third boundary value and equal to or greater than the fourth boundary value and the fourth boundary value is less than the third boundary value. The exposure value calculation unit 440 may set the first exposure value to the sixth correction value that is less than the fourth correction value and greater than the first exposure value when the second ratio is less than the fourth boundary value or equal to or greater than '1'.

In an embodiment, the exposure value calculation unit 440 may linearly decrease the third exposure value as the second ratio decreases when the second ratio is less than the third boundary value and greater than or equal to the fourth boundary value. For example, the exposure value calculation unit 440 may linearly decrease the third exposure value from the fourth correction value to the sixth correction value when the second ratio changes from the third boundary value to the fourth boundary value. The third exposure value may be a value indicating an amount of light per unit area used to display the third image in a specified brightness range. The exposure value calculation unit 440 may change the third exposure value in response to the change of the second ratio to adjust the amount of light such that the third image is displayed in a specified brightness range. Accordingly, it is possible to set the third exposure value within a range between the third boundary value that is the maximum threshold value of the second ratio and the fourth boundary value that is the minimum threshold value of the second ratio.

In an embodiment, when the third exposure value decreases by a unit value, the amount of light may be reduced by half. For example, when the third exposure value is changed from +3 EV to +2 EV, the amount of light may decrease by half. As another example, when the third exposure value is changed from +3 EV to +1 EV, the amount of light may decrease by ¼. Accordingly, when the third exposure value is linearly changed, the brightness of the third image may change exponentially. The exposure value calculation unit 440 may exponentially decrease the brightness of the second image as the second ratio decreases when the second ratio is less than the third boundary value and greater than or equal to the fourth boundary value.

In an embodiment, the exposure value calculation unit 440 may set the third exposure value by using a specified calculation formula. The specified calculation formula may be designed to adjust the third exposure value as shown in FIG. 10. For example, the specified calculation formula may be expressed as follows.

tempEV=SCALE*{SECOND RATIO−THRESH-OLD}+MIN_EV

If tempEV>MAX_EV,Over_EV=MAX_EV

Else if tempEV<MIN_EV,Over_EV=MIN_EV

Else Over_EV=tempEV

When matching this formula to FIG. 10, Over_EV may be the third exposure value. In addition, MAX_EV may be the fourth correction value and MIN_EV may be the sixth correction value. In addition, when the second ratio is less than the third boundary value and greater than or equal to the fourth boundary value, it may be understood that as the second ratio changes, tempEV is linearly calculated according to SCALE, which is a specified slope, and a positive value is applied as the Over_EV value.

In an embodiment, when the specified calculation formula is used, the third exposure value corresponding to the second ratio may be easily set. For example, when SCALE=1, THRESHOLD=2, MAX_EV=3, and MIN_EV=1 in the above specified calculation formula, and when the first brightness, which is the brightness of the first area (e.g., the first area 610 in FIG. 6), is three times the brightness of the second area (e.g., the second area 620 of FIG. 6), it is possible to easily calculate tempEV and Over_EV as follows.

tempEV=1*(3−2)+1=2,Over_EV=+2EV

Figure 11:
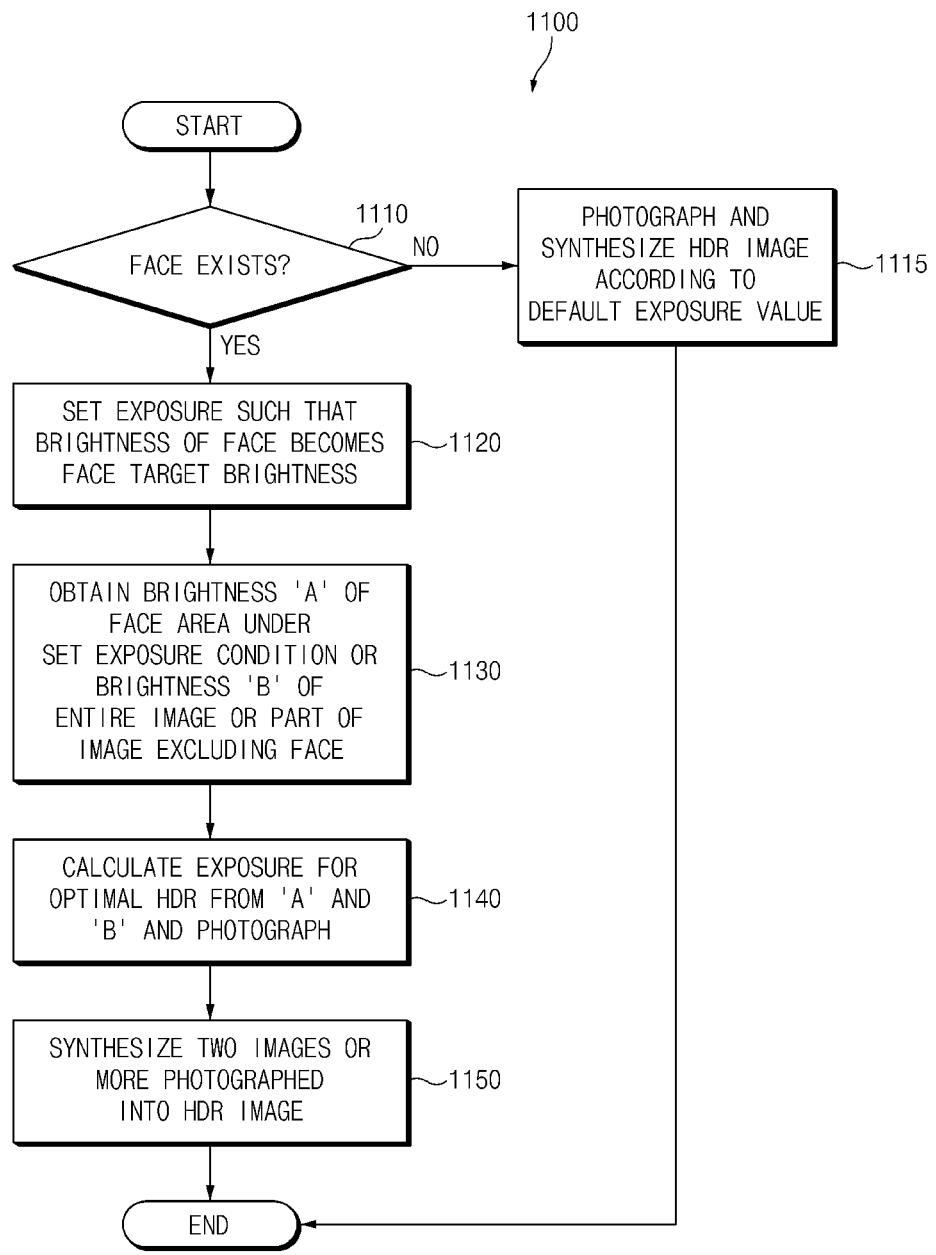
FIG. 11 is a flowchart illustrating a method of synthesizing a high dynamic range image according to an embodiment.

FIG. 11 is a flowchart 1100 illustrating a method of synthesizing a high dynamic range image according to an embodiment.

In operation 1110, the processor (e.g., the processor 120 of FIG. 4) of the electronic device (e.g., the electronic device 101 of FIG. 1) according to an embodiment may determine whether there is a face. The processor 120 may detect the first area (e.g., the first area 610 of FIG. 6) including a face when there is a face in the preview image obtained by the cameras (e.g., the cameras 330, 360, and 370 of FIG. 3) by using the face detection unit (e.g., the face detection unit 410 of FIG. 4). When there is no face in the preview image obtained by the cameras 330, 360, and 370 (operation 1110—NO), the processor 120 may perform operation 1115. When there is a face in the preview image obtained by the cameras 330, 360, and 370 (operation 1110—YES), the processor 120 may perform operation 1120.

In operation 1115, the processor 120 of the electronic device 101 according to an embodiment may photograph and synthesize a high dynamic range image according to a basic exposure value. The processor 120 may set the first exposure value that is a basic exposure value in the basic exposure value setting unit (e.g., the basic exposure value setting unit 420 of FIG. 4). The processor 120 may obtain a first image that is a bracketing image to which a first exposure value is applied, a second image that is a bracketing image to which a second exposure value that is lower than the first exposure value is applied, and a third image that is a bracketing image to which a third exposure value that is an exposure value higher than the first exposure value is applied. The processor 120 may obtain the high dynamic range image by synthesizing the first image with the second image and/or the third image.

In operation 1120, the processor 120 of the electronic device 101 according to an embodiment may set the exposure such that the brightness of the face area becomes the brightness of the face target. The processor 120 may set the first exposure value in the basic exposure value setting unit 420 such that the brightness of the first area 610 falls within a brightness range capable of properly expressing a face. For example, the basic exposure value setting unit 420 may increase the first exposure value by a specified value in order to improve the visibility of a face. Accordingly, the first area 610 may be brighter by a specified value than before the face is detected.

In operation 1130, the processor 120 of the electronic device 101 may obtain the brightness 'a' of the face area and the brightness 'b' of the entire image or a part of the image excluding the face under the set exposure condition. The processor 120 may extract the brightness of the first area 610 as the first brightness 'a' in the brightness extraction unit (e.g., the brightness extraction unit 430 of FIG. 4). The brightness extraction unit 430 may extract the brightness of the entire image or the brightness of the second area (e.g., the second area 620 of FIG. 6) as the second brightness 'b'.

In operation 1140, the processor 120 of the electronic device 101 may calculate the exposure for the optimal high dynamic range image based on the brightness 'a' of the face area and the brightness 'b' of the entire image or a part of the image excluding the face, and proceed with photographing. When the difference between the first brightness 'a' and the second brightness 'b' in the exposure value calculation unit (e.g., the exposure value calculation unit 440 of FIG. 4) is equal to or greater than a specified difference value, the processor 120 may adjust the second exposure value of the second image and/or the third exposure value of the third image. The processor 120 may be set to allow the cameras 330, 360, and 370 to photograph the second image and/or the third image in a state where the exposure value calculated by the exposure value calculation unit 440 is applied.

In operation 1140, the processor 120 of the electronic device 101 according to an embodiment may synthesize two or more photographed images into the high dynamic range image. The processor 120 may generate the high dynamic range image by synthesizing the first image, the second image and/or the third image by using the image synthesis unit (e.g., the image synthesis unit 450 of FIG. 4). The processor 120 may transmit the generated high dynamic range image to the display device (e.g., the display device 160 of FIG. 4) to cause the display (e.g., the display 320 of FIG. 3) to display the high dynamic range image.

Figure 12:
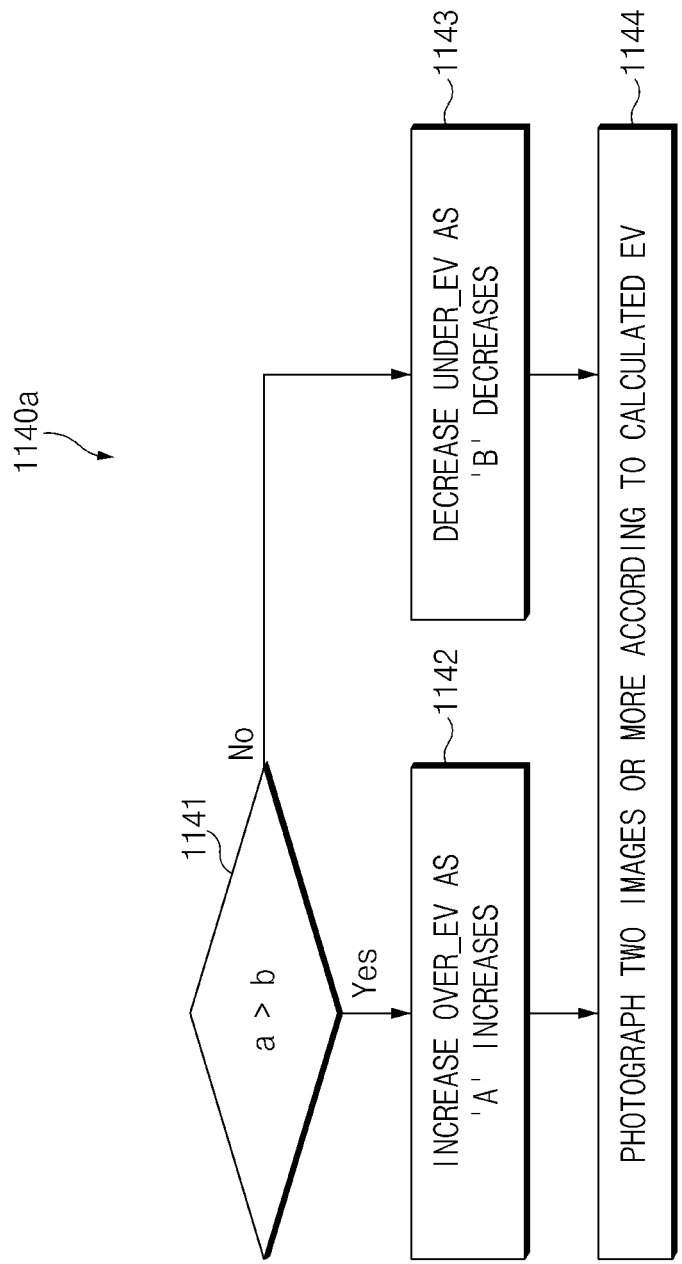
FIG. 12 is a flowchart illustrating a method of calculating an exposure value of a bracketing image according to an embodiment.

FIG. 12 is a flowchart 1140a illustrating a method of calculating an exposure value of a bracketing image according to an embodiment. The flowchart 1140a of FIG. 12 may include operations included in operation 1140 of FIG. 11.

In operation 1141, the processor (e.g., the processor 120 of FIG. 4) of the electronic device (e.g., the electronic device 101 of FIG. 1) according to an embodiment may determine whether the first brightness 'a' has a larger value than the second brightness 'b'. The processor 120 may extract the first brightness 'a' and the second brightness 'b' in the brightness extraction unit (e.g., the brightness extraction unit 430 of FIG. 4) and compare the brightness values. The brightness extraction unit 430 may transmit the first brightness 'a' and the second brightness 'b' to the exposure value setting unit (e.g., the exposure value calculation unit 440 of FIG. 4). When the first brightness 'a' has a greater value than the second brightness 'b' (operations 1141—Yes), the processor 120 may perform operation 1142. When the first brightness 'a' has a smaller value than the second brightness 'b' (operations 1141—No), the processor 120 may perform operation 1143.

In operation 1142, the processor 120 of the electronic device 101 according to an embodiment may increase over EV as the first brightness 'a' increases. The exposure value calculation unit 440 of the processor 120 may increase the third exposure value of the third image as the first brightness 'a' increases when the background area is dark because the first brightness 'a' is brighter than the second brightness 'b'.

In operation 1143, the processor 120 of the electronic device 101 according to an embodiment may lower Under EV as the second brightness 'b' increases. The exposure value calculation unit 440 of the processor 120 may reduce the second exposure value of the second image as the second brightness 'b' increases when the background area is bright because the second brightness 'b' is brighter than the first brightness 'a'.

In operation 1144, the processor 120 of the electronic device 101 according to an embodiment may photograph two or more images according to the calculated EV. In addition to the first image to which the first exposure value, which is the basic exposure value, is applied, the processor 120 may be configured to allow the cameras (e.g., the cameras 330, 360, and 370 of FIG. 3) to photograph the second image to which an exposure value lower than the basic exposure value is applied, and/or the third image to which an exposure value higher than the basic exposure value is applied.

Figure 13A:
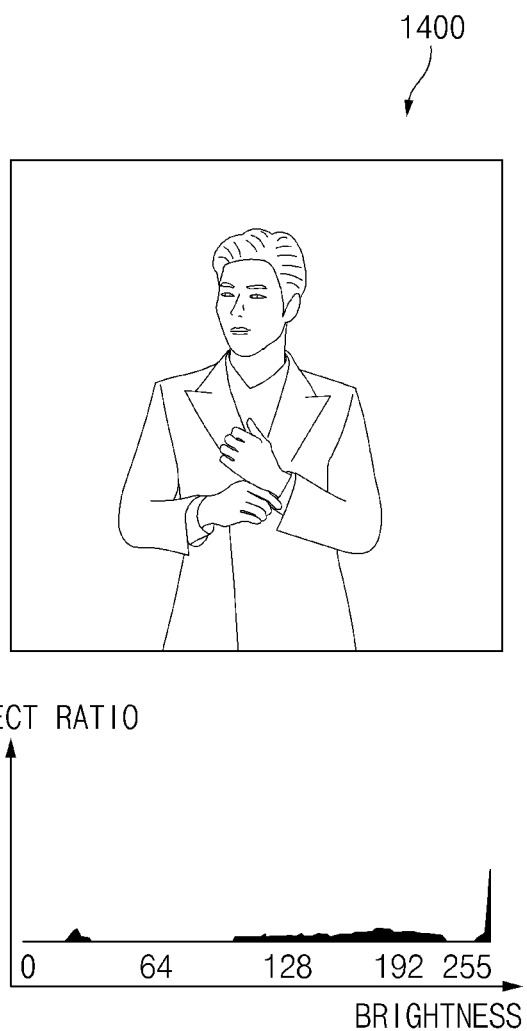
FIG. 13A is a view illustrating a histogram of a conventional high dynamic range image.

FIG. 13A is a view 1400 illustrating a histogram of a conventional high dynamic range image.

In an embodiment, in the conventional high dynamic range image, the exposure value may be increased to allow the face area to be recognized when the background of the backlight is bright because the person has his or her back to external light. When the exposure value is increased, the face area is recognized, but the background area excluding the face area becomes too bright, and the background area may be saturated. The saturated background may become white and it may not be easy for the user to identify what is in the background.

In an embodiment, the conventional high dynamic range image may be expressed as a histogram. The histogram may be a graph showing a ratio of pixels having a corresponding brightness among all pixels constituting a display (e.g., the display 320 of FIG. 3) displaying the high dynamic range image by brightness. For example, in the histogram, brightness such as a gray level may be set on a horizontal axis, and a screen ratio that is a ratio of an area having a corresponding brightness compared to an area of the entire screen may be set as a vertical axis.

In an embodiment, when background saturation occurs, it can be seen that the aspect ratio from the 192 level to the 255 level, which is a high brightness component, is increased on the histogram.

Figure 13B:
FIG. 13B is a view illustrating a histogram of a high dynamic range image according to an embodiment.
Figure 13B:
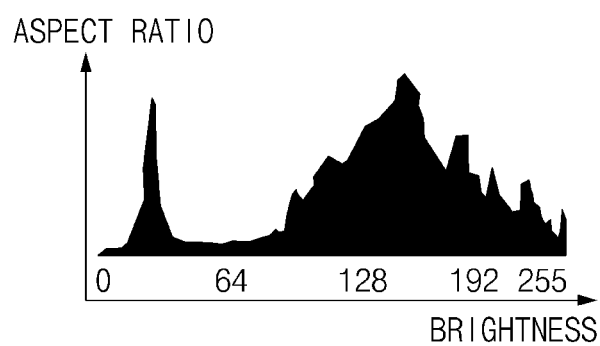

FIG. 13B is a view 1450 illustrating a histogram of a high dynamic range image according to an embodiment.

The high dynamic range image according to an embodiment may adjust the exposure values of at least some of the plurality of bracketing images used for synthesizing the high dynamic range image. As a result, in the high dynamic range image according to an embodiment, the exposure values for the face area where the face of a person is disposed and the area excluding the face area may be set differently. For example, in the high dynamic range image according to an embodiment, when the background is bright because the person has his or her back to external light, in a state where the face area has an exposure value that is recognized as the basic exposure value, the exposure value of a bracketing image having the exposure value lower than the basic exposure value may be decreased, so that it is possible to prevent background saturation from occurring.

When the high dynamic range image according to an embodiment is expressed as a histogram, it may be confirmed that the aspect ratio from the 192 level to the 255 level, which is a high brightness component, is decreased, and the aspect ratio from the 128 level to the 192 level, which is a medium brightness component, is increased.

Figure 14:
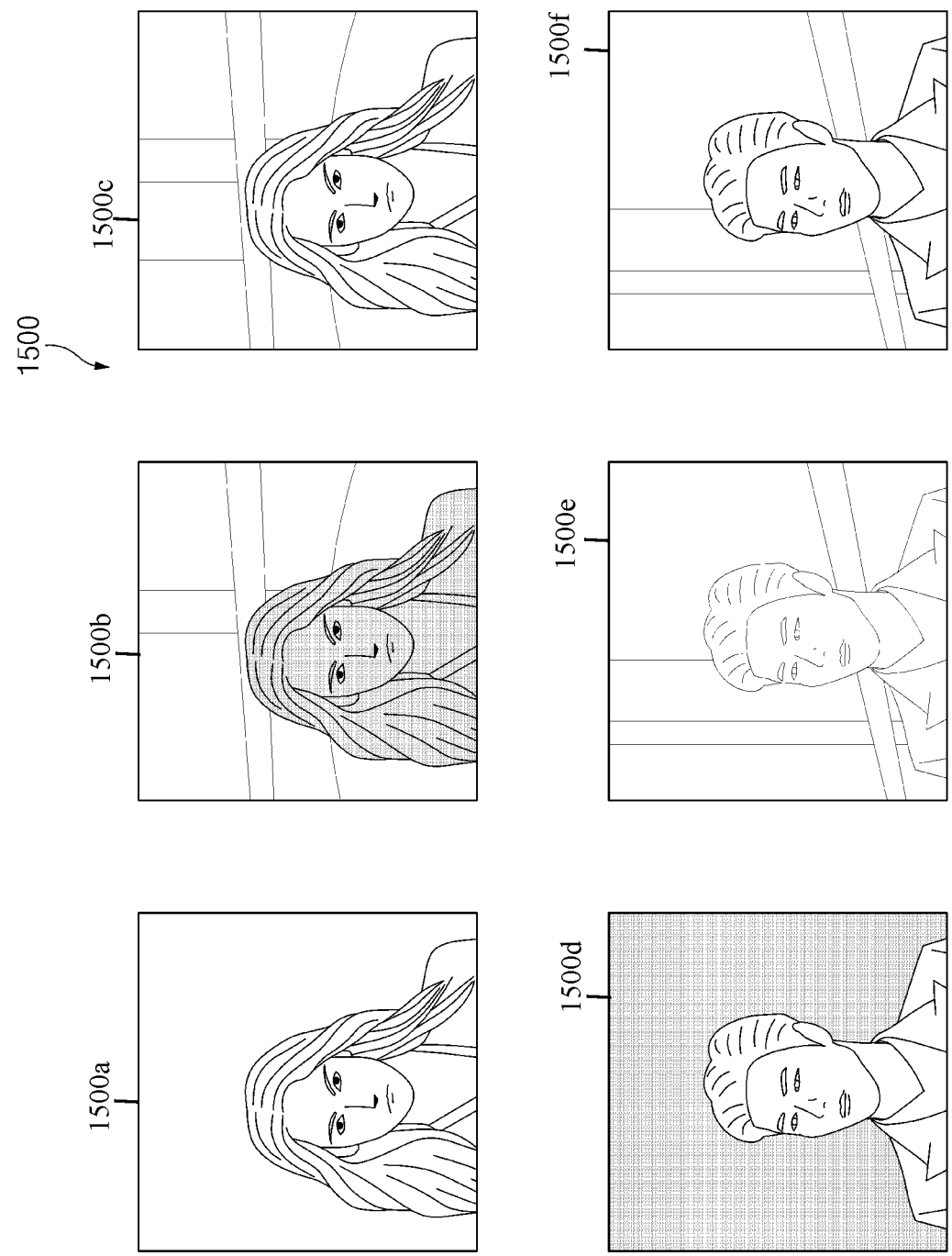
FIG. 14 is a view illustrating a high dynamic range image according to various embodiments.

FIG. 14 is a view 1500 illustrating a high dynamic range image according to various embodiments.

In an embodiment, when a backlight image including a face is photographed, the background may be saturated in the bracketing image 1500a in which the exposure value is set to cause the face to have a specified brightness range. In addition, the face may appear dark in the bracketing image 1500b in which the exposure value is reduced to prevent background saturation. In the high dynamic range image 1500c obtained by combining the bracketing image 1500a and the bracketing image 1500b, the user may easily recognize the face and the background because the background is not saturated while the face has a specified brightness range. The situation in which the bracketing image 1500a and the bracketing image 1500b are combined to generate the high dynamic range image 1500c may be substantially the same as the situation in which the first exposure value and the third exposure value are kept constant and the second exposure value is reduced when the second brightness is brighter than the first brightness.

In an embodiment, when the background is very dark compared to the face, the background may not be recognized in a bracketing image 1500d in which the exposure value is set to have a specified brightness range. In addition, in a bracketing image 1500e in which the background is expressed with appropriate brightness, the face area may be saturated. In a high dynamic range image 1500f obtained by combining the bracketing image 1500d and the bracketing image 1500e, the user can easily recognize the face and the background because the face is not saturated while the background has a specified brightness range. The situation in which the bracketing image 1500d and the bracketing image 1500e are combined to generate the high dynamic range image 1500f may be the same as the situation in which the first exposure value and the second exposure value are kept constant and the third exposure value is increased when the second brightness is darker than the first brightness.

Figure 15:
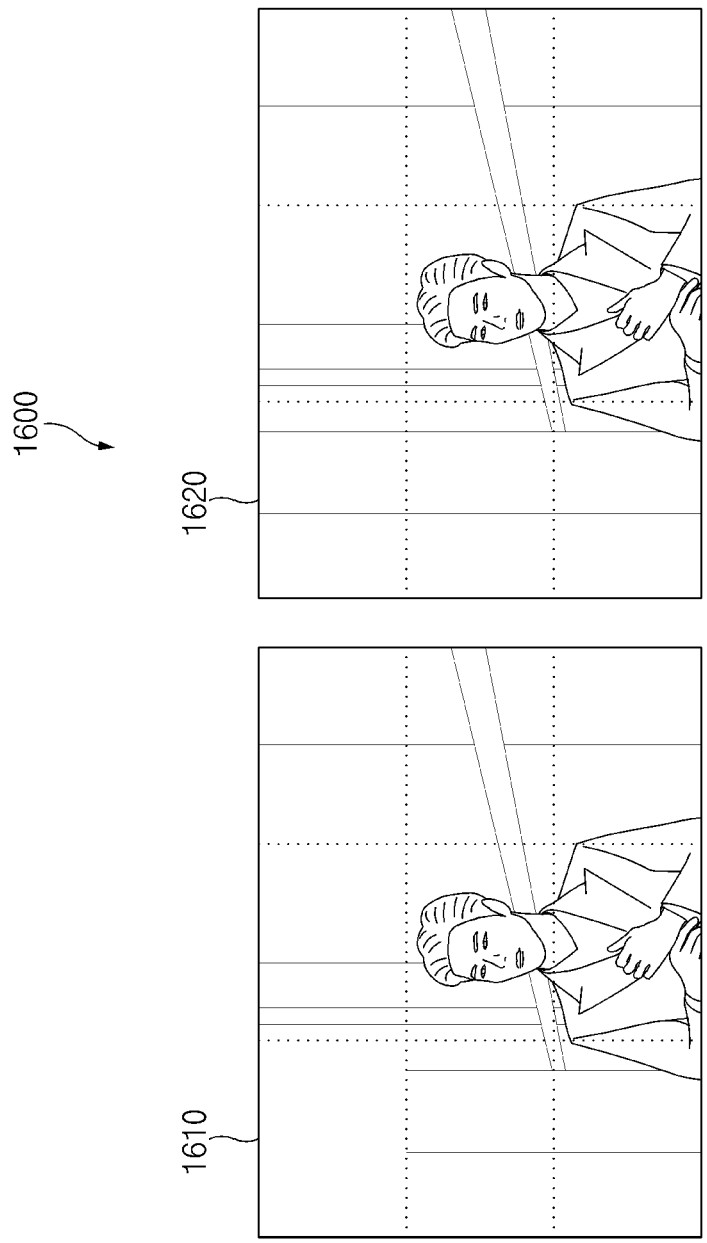
FIG. 15 is a view illustrating a method of generating a high dynamic range image in which an electronic device according to an embodiment calculates the brightness of a background area.

FIG. 15 is a view 1600 illustrating a method of generating a high dynamic range image in which an electronic device (e.g., the electronic device 101 of FIG. 1) according to an embodiment calculates the brightness of a background area (e.g., the second area 620 of FIG. 6).

In an embodiment, the processor (e.g., the processor 120 of FIG. 4) of the electronic device 101 may extract the brightness of an area outside the specified brightness range among the second area 620 excluding the face area (e.g., the first area 610 of FIG. 6) in the image. The brightness extraction unit (e.g., the brightness extraction unit 430 of FIG. 4) of the processor 120 may divide the second area 620 into a plurality of sub areas to extract brightness. For example, the brightness extraction unit 430 may divide the image into 9 sub-areas, and extract the brightness of each of the 8 sub-areas constituting the second area 620 except for the central sub-area that is the face area. The brightness extraction unit 430 may identify an area outside the specified brightness range among the plurality of sub areas, and extract the brightness of the area outside the specified brightness range. For example, the brightness extraction unit 430 may identify an upper left area 1610 in which saturation occurs and which is brighter than a specified brightness range, among 8 sub-areas constituting the second area 620, and extract the brightness of the upper left area 1610 in which saturation occurs.

In an embodiment, the processor 120 of the electronic device 101 may adjust the exposure value such that the background is recognized in an area outside the specified brightness range. The processor 120 may adjust the exposure value of the bracketing image corresponding to an area that is not properly viewed outside of a specified brightness range by using the exposure value calculation unit (e.g., the exposure value calculation unit 440 of FIG. 4). Accordingly, it may be confirmed that saturation does not occur in the corrected upper left area 1620 and the background is correctly recognized.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing including a first surface facing in a first direction and a second surface facing in a second direction opposite to the first surface;
a display exposed in the first direction through the first surface of the housing;
a camera at least partially exposed in the first direction through the first surface of the housing or at least partially exposed in the second direction through the second surface of the housing to photograph an image; and
a processor operatively coupled to the display and the camera, wherein the processor is configured to:
recognize a face among a plurality of preview images,
set a first exposure value of a first image that is one of the plurality of preview images to a basic exposure value among the plurality of preview images such that a first brightness falls within a specified brightness range, wherein the first brightness is of a first area including the face,
extract the first brightness and a second brightness, wherein the second brightness is of a second area excluding the first area,
when a difference between the first brightness and the second brightness is greater than or equal to a specified difference value, adjust at least one of a second exposure value of a second image or a third exposure value of a third image, wherein the second image and the third image are bracketing images, wherein the second exposure value corresponding to the second image is smaller than the first exposure value of the first image, and wherein the third exposure value corresponding to the third image is greater than the first exposure value of the first image,
generate a high dynamic range (HDR) image by synthesizing at least one of a bracketing image including the first exposure value, the second image or the third image, and
display the generated high dynamic range image on the display.

2. The electronic device of claim 1, wherein the processor is further configured to:
maintain the first exposure value and the third exposure value; and
adjust the second exposure value when the second brightness is brighter than the first brightness.

3. The electronic device of claim 2, wherein the processor is further configured to:
set the second exposure value to a first correction value when a ratio of the second brightness to the first brightness is equal to or greater than a first boundary value;
set the second exposure value to a second correction value when the ratio is (i) less than the first boundary value and (ii) equal to or greater than a second boundary value, wherein the second correction value is greater than the first correction value and the second boundary value is less than the first boundary value; and
set the second exposure value to a third correction value when the ratio is (i) less than the second boundary value and (ii) equal to or greater than '1,' wherein the third correction value that is (i) greater than the second correction value and (ii) less than the first exposure value.

4. The electronic device of claim 2, wherein the processor is further configured to:
set the second exposure value to a first correction value when a ratio of the second brightness to the first brightness is equal to or greater than a first boundary value;
increase the second exposure value as the ratio decreases when the ratio is (i) less than the first boundary value and (ii) equal to or greater than a second boundary value, wherein the second boundary value is less than the first boundary value; and
set the second exposure value to a second correction value when the ratio is (i) less than the second boundary value and (ii) equal to or greater than '1,' wherein the second correction value is (i) greater than the first correction value and (ii) less than the first exposure value.

5. The electronic device of claim 1, wherein the processor is further configured to:
maintain the first exposure value and the second exposure value; and
adjust the third exposure value when the second brightness is darker than the first brightness.

6. The electronic device of claim 5, wherein the processor is further configured to:
set the third exposure value to a first correction value when a ratio of the first brightness to the second brightness is equal to or greater than a first boundary value;
set the third exposure value to a second correction value when the ratio is (i) less than the first boundary value and (ii) equal to or greater than a second boundary value, wherein the second correction value smaller than the first correction value and the second boundary value is less than the first boundary value; and
set the third exposure value to a third correction value when the ratio is (i) less than the second boundary value and (ii) greater than '1,' wherein the third correction value is (i) less than the second correction value and (ii) greater than the first exposure value.

7. The electronic device of claim 5, wherein the processor is further configured to:
set the third exposure value as a first correction value when a ratio of the first brightness to the second brightness is equal to or greater than a first boundary value;
decrease the third exposure value as the ratio decreases when the ratio is (i) less than the first boundary value and (ii) equal to or greater than a second boundary value, wherein the second boundary value is less than the first boundary value; and set the third exposure value as a third correction value that is less than a second correction value and greater than the first exposure value when the ratio is less than the second boundary value and greater than '1'.

8. The electronic device of claim 1, wherein the processor is further configured to:

extract all brightness of the first area and the second area or extract brightness of a partial area in the second area including brightness outside a specified range to extract the second brightness.

9. A method of adjusting an exposure value of an image obtained by a camera of an electronic device including a display, the method comprising:

recognizing a face among a plurality of preview images;

setting a first exposure value of a first image that is one of the plurality of preview images to a basic exposure value among the plurality of preview images such that a first brightness falls within a specified brightness range, wherein the first brightness is of a first area including the face;

extracting the first brightness and a second brightness, wherein the second brightness is of a second area excluding the first area;

when a difference between the first brightness and the second brightness is greater than or equal to a specified difference value, adjusting at least one of a second exposure value of a second image or a third exposure value of a third image, wherein the second image and the third image are bracketing images, wherein the second exposure value corresponding to the second image is smaller than the first exposure value of the first image, and wherein the third exposure value corresponding to the third image is greater than the first exposure value of the first image;

generating a high dynamic range image by synthesizing at least one of a bracketing image including the first exposure value, the second image or the third image; and displaying the generated high dynamic range image on the display.

10. The method of claim 9, further comprising:

maintaining the first exposure value and the third exposure value; and adjusting the second exposure value when the second brightness is brighter than the first brightness.

11. The method of claim 10, further comprising:

setting the second exposure value to a first correction value when a ratio of the second brightness to the first brightness is equal to or greater than a first boundary value;

setting the second exposure value to a second correction value when the ratio is (i) less than the first boundary value and (ii) equal to or greater than a second boundary value, wherein the second correction value is greater than the first correction value and the second boundary value is less than the first boundary value; and setting the second exposure value to a third correction value when the ratio is (i) less than the second boundary value and (ii) equal to or greater than '1,' wherein the third correction value that is (i) greater than the second correction value and (ii) less than the first exposure value.

12. The method of claim 10, further comprising:

setting the second exposure value to a first correction value when a ratio of the second brightness to the first brightness is equal to or greater than a first boundary value;

increasing the second exposure value as the ratio decreases when the ratio is (i) less than the first boundary value and (ii) equal to or greater than a second boundary value, wherein the second boundary value is less than the first boundary value; and setting the second exposure value to a second correction value when the ratio is (i) less than the second boundary value and (ii) equal to or greater than '1,' wherein the second correction value is (i) greater than the first correction value and (ii) less than the first exposure value.

13. The method of claim 9, further comprising:

maintaining the first exposure value and the second exposure value; and adjusting the third exposure value when the second brightness is darker than the first brightness.

14. The method of claim 13, further comprising:

setting the third exposure value to a first correction value when a ratio of the first brightness to the second brightness is equal to or greater than a first boundary value;

setting the third exposure value to a second correction value when the ratio is (i) less than the first boundary value and (ii) equal to or greater than a second boundary value, wherein the second correction value smaller than the first correction value and the second boundary value is less than the first boundary value; and setting the third exposure value to a third correction value when the ratio is (i) less than the second boundary value and (ii) greater than '1,' wherein the third correction value is (i) less than the second correction value and (ii) greater than the first exposure value.

15. The method of claim 13, further comprising:

setting the third exposure value to a first correction value when a ratio of the first brightness to the second brightness is equal to or greater than a first boundary value;

decreasing the third exposure value as the ratio decreases when the ratio is (i) less than the first boundary value and (ii) equal to or greater than a second boundary value, wherein the second boundary value is less than the first boundary value; and setting the third exposure value to a third correction value that is less than a second correction value and greater than the first exposure value when the ratio is less than the second boundary value and greater than '1'.

16. The method of claim 9, further comprising extracting all brightness of the first area and the second area or extract brightness of a partial area in the second area including brightness outside a specified range to extract the second brightness.

17. A non-transitory computer readable medium containing instructions that when executed cause at least one processor of an electronic device to:

recognize a face among a plurality of preview images;

set a first exposure value of a first image that is one of the plurality of preview images to a basic exposure value among the plurality of preview images such that a first brightness falls within a specified brightness range, wherein the first brightness is of a first area including the face;

extract the first brightness and a second brightness, wherein the second brightness is of a second area excluding the first area;

when a difference between the first brightness and the second brightness is greater than or equal to a specified difference value, adjust at least one of a second exposure value of a second image or a third exposure value of a third image, wherein the second image and the third image are bracketing images, wherein the second exposure value corresponding to the second image is smaller than the first exposure value of the first image, and wherein the third exposure value corresponding to the third image is greater than the first exposure value of the first image;

generate a high dynamic range (HDR) image by synthesizing at least one of a bracketing image including the first exposure value, the second image or the third image; and display the generated high dynamic range image on a display.

18. The computer readable medium of claim 17, further containing instructions that when executed cause the at least one processor to:

maintain the first exposure value and the third exposure value; and adjust the second exposure value when the second brightness is brighter than the first brightness.

19. The computer readable medium of claim 18, further containing instructions that when executed cause the at least one processor to:

set the second exposure value to a first correction value when a ratio of the second brightness to the first brightness is equal to or greater than a first boundary value;

set the second exposure value to a second correction value when the ratio is (i) less than the first boundary value and (ii) equal to or greater than a second boundary value, wherein the second correction value is greater than the first correction value and the second boundary value is less than the first boundary value; and set the second exposure value to a third correction value when the ratio is (i) less than the second boundary value and (ii) equal to or greater than '1,' wherein the third correction value that is (i) greater than the second correction value and (ii) less than the first exposure value.

20. The computer readable medium of claim 18, further containing instructions that when executed cause the at least one processor to:

set the second exposure value to a first correction value when a ratio of the second brightness to the first brightness is equal to or greater than a first boundary value;

increase the second exposure value as the ratio decreases when the ratio is (i) less than the first boundary value and (ii) equal to or greater than a second boundary value, wherein the second boundary value is less than the first boundary value; and set the second exposure value to a second correction value when the ratio is (i) less than the second boundary value and (ii) equal to or greater than '1,' wherein the second correction value is (i) greater than the first correction value and (ii) less than the first exposure value.

* * * * *